United States Patent [19]

Toppel et al.

[11] Patent Number: 5,169,480
[45] Date of Patent: Dec. 8, 1992

[54] TIME-CONTROL CIRCUIT FOR PNEUMATICALLY OPERABLE DEVICES

[75] Inventors: Robert Toppel, Palatine; David E. Crittenden, Schaumburg, both of Ill.

[73] Assignee: Signode Corporation, Glenview, Ill.

[21] Appl. No.: 476,873

[22] Filed: Feb. 8, 1990

[51] Int. Cl.$^5$ ............................... B32B 31/00
[52] U.S. Cl. ................................ 156/358; 156/73.5; 156/502; 156/366; 137/624.14; 251/37; 417/12
[58] Field of Search ............. 251/33, 36, 37; 137/624.11, 624.14; 417/12; 156/73.4, 73.5, 358, 502

[56] References Cited

U.S. PATENT DOCUMENTS

| | | | |
|---|---|---|---|
| 3,093,114 | 6/1963 | Heidler | 121/33 |
| 3,679,519 | 7/1972 | Frey | 156/73.5 X |
| 4,305,774 | 12/1981 | Wedeking et al. | 156/73.5 X |
| 4,535,812 | 8/1985 | Miller | 137/624.11 |
| 4,629,530 | 12/1986 | Becking | 156/73.4 X |
| 4,657,626 | 4/1987 | Cearlock et al. | 156/73.5 X |

OTHER PUBLICATIONS

"Timer-Delay Systems", *Engineers' Digest* (vol. 34, No. 8; Aug. 1973; pp. 29-31).

*Primary Examiner*—David A. Simmons
*Assistant Examiner*—James J. Engel, Jr.
*Attorney, Agent, or Firm*—Schwartz & Weinrieb

[57] ABSTRACT

A timing control circuit for a pneumatically-operable device, which is manually actuable so as to provide fluid flow to a revervoir through means of a variable flow control valve and a line-pressure-operable, normally-open valve disposed within the primary fluid flow, is disclosed. The pressure operable valve is closed at a sensed line pressure so as to interrupt fluid flow to the tool so as to terminate an operating cycle.

16 Claims, 2 Drawing Sheets

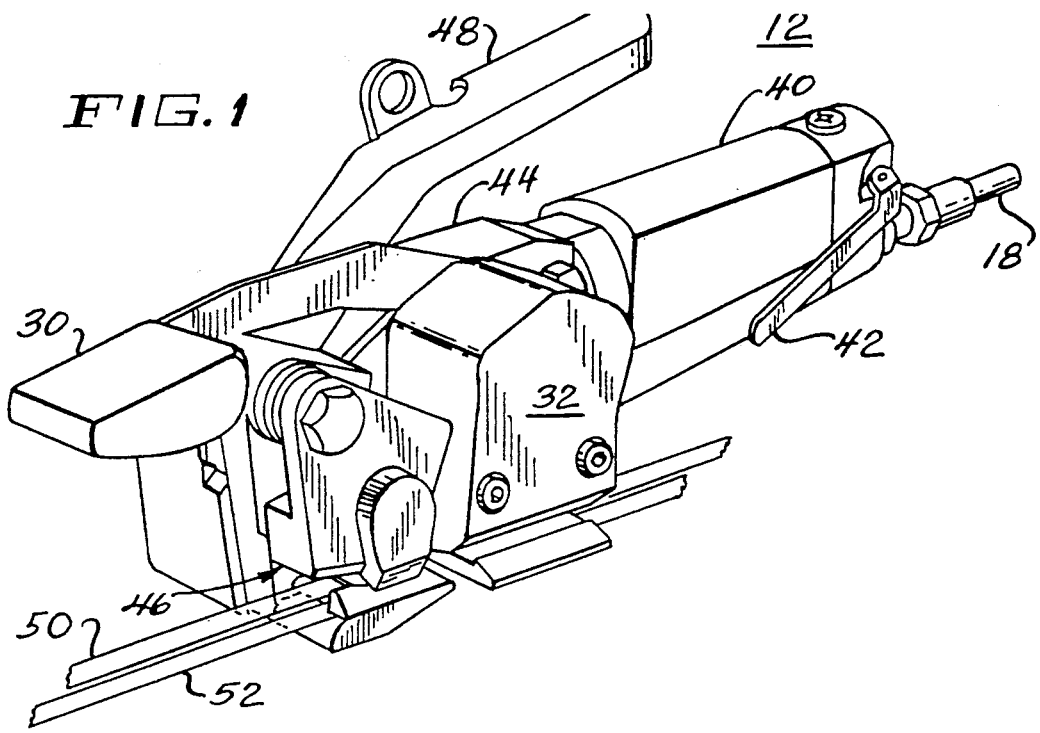

TIME-CONTROL CIRCUIT FOR PNEUMATICALLY OPERABLE DEVICES

FIELD OF THE INVENTION

The present invention provides a timing circuit for pneumatically operable devices. More specifically, the present invention may be utilized in connection with hand tools for binding and securing plastic strapping where the loop tensioning cycle is controlled by a sensing means and the weld cycle is dependent upon operator judgment.

BACKGROUND OF THE INVENTION

Tools for tightening and binding strapping about packages and articles have been utilized for many years and they include pneumatic, hydraulic and electrically driven tools. Many of the earlier tools were utilized to cinch and secure steel strapping with clips, clamps, and formed interlocking notches. The introduction of plastic strapping required development of newer tools and new strap joining techniques, which included strap weldments. The tools for plastic strapping are most frequently pneumatically or electrically driven for both cost and weight considerations. The plastic strapping is constricted about a package by means of a mechanism which drives one end of overlapped strap portions so as to tighten the loop to a predetermined and sensed tensile load. Thereafter, the strap is held in position, the driving mechanism is disabled and the overlapped strap ends are secured together by means of fusion welding.

The tools for binding and securing plastic strapping are relatively new and require special techniques so as to provide sound weld joints for the overlapping strap ends forming the loop about a package. Weldments avoid the use of secondary clips and fasteners to join the taut strapping looped about bundles and packages. Indicative of the early efforts at hand tools for securing looped plastic strapping is the electrically controlled hand tool taught in U.S. Pat. No. 3,586,572 to Ericsson, which utilized a drive means coupled to an electric motor for tensioning the plastic strap looped about a bundle or package. Thereafter, the frictionally engaged and overlapping strap portions were rapidly oscillated so as to melt a surface region of the strapping for fusion by means of interface solidification so as to provide a weldment between the looped straps. The drive means included a rotary output shaft whose rotary motion was converted into a rocking movement for intermittent rotary movement of the strap gripping member so as to provide an oscillating movement for effecting the friction-fusion joining of the overlapping strap portions.

Earlier efforts at strap fusion and welding utilizing pneumatically operated tools is exemplified by the completely automatic-type application tool taught in U.S. Pat. No. 3,442,203-Kobiella, where plastic strap is automatically fed around a package from a strap supply source; the leading end of the strap is grasped; the trailing end of the strap is drawn backwardly so as to tension the strap loop; and, thereafter, the overlapping portions of the loop are friction fused. However, this apparatus is a stand-alone machine and not a completely portable hand-held tool.

Hand-held, pneumatically-operated tools have been provided so as to accomplish joining and fusion bonding or securing together plastic strapping. In these hand-held tools, the strap is manually fed about a package so as to bring the strapping portions into overlapping registry with respect to each other, the strap loop is tightly cinched and the strap ends are secured by means of friction-fusion. Indicative of these tools are the VFL and VFM tension-weld strapping tools provided by the Signode Corporation and illustrated as catalog number 186096, where overlapping strap portions are inserted into a feedwheel mechanism and an air motor is activated by means of a lever operator so as to tighten the strap about a package to a predetermined tension noted by means of the motor stalling. Thereafter, an eccentric handle is utilized to actuate the fusion operation. However, it has been found that the actuation time for the fusion operation will vary with the type of plastic, strap thickness, strap width, and ambient temperature, as well as operator ability to judge completion of the weldment.

Pneumatically operated tools have found wide application and usage within the strap industry as well as other industries. The manufacturers and suppliers of these tools have provided control mechanisms for controlling or sensing operations based upon their own initiative and in response to customer demand. In the strapping tool industry, tools are provided with means for sensing the strap tension and disengaging the drive mechanism at a predetermined strap tensile force, as well as other sophisticated controls which minimize operator judgment in providing a bound strap about a package. However, the tool manufacturers have not yet provided a means to minimize operator judgment with respect to the time function so as to provide a secure weldment between the overlapped plastic straps. Therefore, a device for controlling the fusion welding operation by means of these hand-held tools is very desirable so as to cure variations in the weldments, which are now dependent upon operator judgment. Although a timing control program or procedure in some form was previously conceivable, the desired device was required to be compact and easily adapted to existing friction fusion hand tools.

SUMMARY OF THE INVENTION

The present invention provides a timing control arrangement particularly illustrated adapted for a pneumatically-controlled, hand-held strapping tool, which tightens and secures a loop strap about a package. The strapping is plastic and is generally secured by means of a friction-fusion welding process. The timing circuit is coupled in parallel with the pneumatically-operable tool motor, which is connected to a source of fluid at a predetermined line pressure, and is operable so as to terminate the fluid flow to the motor at a predetermined time after it is actuated. A pressure-actuable pilot valve is responsive to a sensed pressure within the timing circuit so as to terminate the fluid flow supply to the hand tool.

In the illustrated embodiment, a normally-closed, manually-operable, fluid flow control apparatus or valve is coupled between the source of fluid at a predetermined line pressure and a variable flow control valve with an adjustable orifice and a fixed-volume reservoir. This normally-closed valve is simultaneously actuable along with engagement of the hand tool securing means so as to provide fluid flow through the variable rate valve to the reservoir at a predetermined flow rate. The reservoir is connected to a pressure-responsive, pilot-valve actuator, which senses the reservoir line-pressure and at a predetermined line-pressure moves the pilot valve from its normally open position to a closed position so as to terminate fluid communication to the hand tool. The time period for the tool operating cycle is thus a function of the rate of flow of the fluid through the variable control valve, which is adjustable so as to restrict the time period for both filling the reservoir and developing a back pressure great enough to actuate the pilot valve actuator. The variable rate flow control valve is equipped with a check valve which opens to more rapidly vent the fluid reservoir after closure of the pilot valve.

BRIEF DESCRIPTION OF THE DRAWINGS

Various other objects, features, and attendant advantages of the present invention will become more fully appreciated from the following detailed description, when considered in connection with the accompanying drawings, in which like reference numerals identify like components throughout the several views, and wherein:

FIG. 1 is a perspective view of a hand-held, pneumatically driven strapping tool;

FIG. 2 is a perspective view of the strapping tool of FIG. 1 in partial exploded section with an exemplary timing control circuit incorporated therein.

DESCRIPTION OF THE PREFERRED EMBODIMENT

Figure 3:
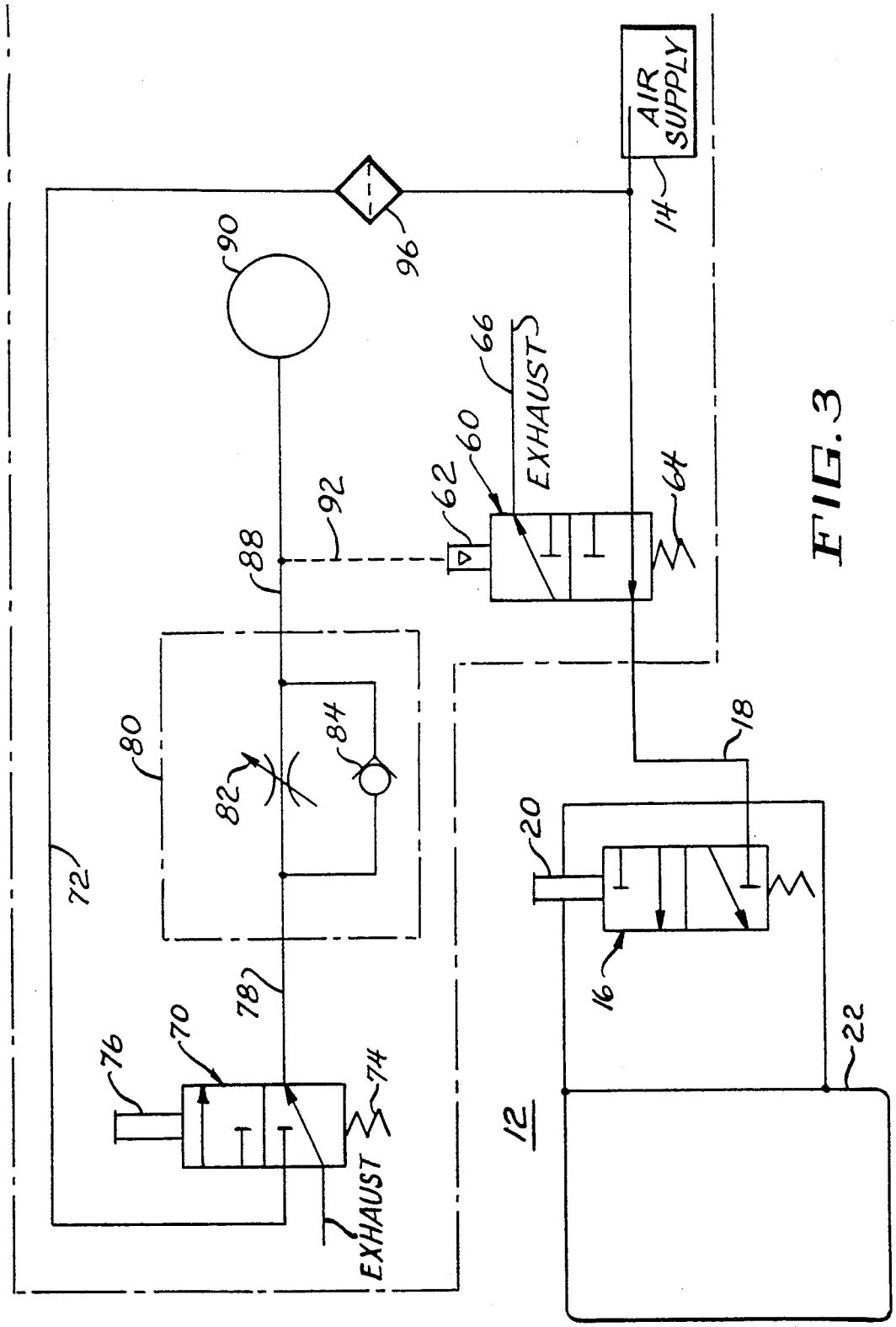
FIG. 3 is a schematic diagram of a preferred embodiment of the timing control circuit for the strapping tool of FIG. 1.

In FIG. 3, timing control circuit 10 is schematically illustrated in dashed outline and is coupled to a handheld and pneumatically-operable tool 12. Although hand tools are utilized for cinching or constricting steel strapping, the present illustration is particularly directed to a hand-held tool 12 for tightening and securing plastic strapping about a package. The plastic strapping may be made from various chemical composition materials, and is not limited to any particular plastic composition or strap size.

Hand tool 12 is coupled to a source of fluid 14 at a predetermined line pressure and has a timing control circuit 10 operatively associated therewith, which is selectively actuable by means of an eccentric handle 30 so as to block fluid flow after a predetermined time in order to terminate a tool operating cycle. A manually-operable, normally-closed flow control valve 16 is directly coupled to the source of fluid 14 by means of a conduit 18. Depression of a manual actuator 20 opens valve 16 for fluid communication from source 14 to drive means or air motor 22 of hand tool 12. Strapping tool 12 utilizes a feedwheel assembly 46 to constrict or shrink a strapping loop wrapped around an article to a predetermined tension, which may be sensed by means of a slipping clutch so as to limit or avoid over-tensioning of the overlapped strap portions. Thereafter, hand tool 12 is actuable so as to fusion weld the overlapped straps at the predetermined tension by means of engagement of vibratory welding assembly 32 in FIG. 2, which is integral with hand tool 12. The feedwheel mechanisms and welding assembly are known in the art and are illustrated exemplified by means of pneumatically-operable Signode tension-weld strapping tool Models VFL and VFM. These tool structures and their operation are taught and illustrated by means of Signode catalog No. 186096, and will not be described in detail in the present application.

Hand tool 12 in FIGS. 1–3 is generally equipped with both feedwheel tensioning apparatus 46 and fusion welding assembly 32 noted above, however, welding assembly 32 is actuated after attainment of the predetermined strap tension sensed by means of the hand tool and noted by means of clutch slipping or motor stalling. The fusion welding operation requires a relatively fixed period of operating time so as to provide sound weldment of the overlapped and pretensioned straps. Historically, the weldment period has been dependent upon operator determination to determine the operating period, which was terminated by subsequent disengagement of eccentric handle 30 for weld completion and tool disengagement from the overlapped straps. However, judgment and evaluation by means of an individual of what constitutes a good weld will vary among individuals, and, therefore, it is very desirable to provide a repetitive welding cycle operation, which is independent of operator judgment. In the illustrated embodiment, the timing control arrangement 10 and the welding vibrator assembly 32 for the fusion welding of the overlapping strap portions 50 and 52 are simultaneously actuated by means of the rotation of eccentric handle 30, wherein the timing control arrangement 10 may be adjusted to a desired operating period of time for proper achievement of the welding operation. The operating period is independent of operator judgment, but may be adjusted with respect to the particular strap parameters.

In FIG. 1, hand tool 12 for cinching a strap loop about a package has a motor housing 40 with an air motor 22, generally shown but the details of which are not shown secured therein. Engagement between the source of fluid 14 at the predetermined line-pressure and valve 16 is provided by means of the depression of handle 42 so as to actuate manual operator 20. The exact lever coupling linkage and mechanical connections are determined by means of the design of the particular hand tool and are not illustrated herein. Air motor 22 within motor housing 40 is coupled to a gear transfer arrangement within gear housing 44 so as to drive a feed wheel within the feedwheel assembly 46, wherein the feed wheel assembly and the feed wheel thereof are known in the art and exemplified by means of the above-noted Signode Catalog 186096. Depression of lever 48 opens feed wheel assembly 46 for the introduction of overlapping strap portions 50 and 52 generally looped or wrapped about a package or article (not shown). Release of handle 48 provides the overlapped straps in a secured position within track 47 of feed wheel assembly 46 and welding apparatus 32. Subsequent depression of lever 42 communicates fluid at a predetermined pressure and drives motor 22 and the feedwheel within the feedwheel assembly 46 for cinching or shrinking of the loop about the article or package by drawing one of the strap portions 50 or 52 backwardly relative to the other until a predetermined tensile load is developed within the straps, which causes motor 22 to stall. After motor stalling at the predetermined strap tension, rotation of eccentric handle 30 actuates welding assembly 32 so as to weld the taut, overlapping straps.

Welding cycle actuation and tool operation by means of the operator required a certain technique matched to both the type of strapping and the gauge and/or width of the strapping so as to provide a proper or good weld between the overlapped strap sections. Illustrative of this technique was the requirement for rapid actuation of the eccentric handle and a momentary pause upon completion of the actuating movement for thin strapping, or a slightly longer pause for a thicker gauge strap of the same material. As noted above, the prior art provided a single valve 16, which was manually operable by means of handle 42 and actuator 20, to open the fluid communication and actuate motor 22 and feedwheel 46 so as to tighten the strap. Thereafter, the stalling of motor 22 indicated completion of the strap tensioning and signalled the operator to rotate eccentric handle 30 so as to actuate welding assembly 32. Therefore, weld timing is critical, and timing circuit 10 removes operator judgment and evaluation of this time constraint for utilization of the hand tool and provision of a good weldment upon a tightened strap.

In the preferred embodiment illustrated schematically in FIG. 3 and in an as-assembled state in FIG. 2, timing control circuit 10 may be incorporated within either one of the above-noted VFL or VFM tools, as an example. Timing control circuit 10 at the illustrated reference position of FIG. 3 is coupled to air supply 14 and includes normally-open, three-way, pilot valve 60, which is in-line with conduit 18 for open fluid communication between manually-operable valve 16 of hand tool 12, and source of fluid 14. Valve 60 is operable between its normally-open position for fluid flow to valve 16 and its closed position which deactivates motor 22 and exhausts valve 60 and motor 22 to the atmosphere through means of conduit 66. Biasing means 64 biases valve 60 to the normally-open position, as illustrated at FIG. 3, which biasing means 64 may be overcome by means of a force applied to pressure-operable activator 62 so as to move valve 60 to the closed position.

Three-way valve 70 of circuit 10 is coupled to fluid source 14 through means of a first conduit 72 so as and is operable by means of manual actuator 76 to be moved to the open position against biasing means 74 from its normally-closed position. Thus, it can be seen that fluid supply 14 is coupled along parallel conduits 18 and 72 to tool 12 and timing control circuit 10, respectively, and more specifically, fluid flow is provided to normally-closed valve 70 of circuit 10 and through means of normally-open pilot valve 60 to valve 16 within tool 12. Second conduit 78 couples three-way valve 70 to variable flow control valve 80, which includes an adjustable orifice restriction 82 and a check valve 84 in parallel with adjustable orifice 82 so as to more rapidly exhaust the downstream timing circuit elements upon closure of valve 60 and deactivation of motor 22. The downstream fluid flow from valve 80 is communicated through means of conduit 88 to fixed volume chamber or reservoir 90. Pressure-operable actuator 62 of pilot valve 60 is coupled to conduit 88 through means of conduit 92 and is responsive to line-pressure above a predetermined value so as to close valve 60, which interrupts fluid flow through means of conduit 18 so as to deactivate motor 22 and thereby end an operating cycle.

Energization of the vibratory welding assembly 32 by means of the rotation of eccentric handle 30 simultaneously moves manual actuator 76 and valve 70 against the bias of biasing means 74, so as to communicate fluid to variable flow-control valve 80. Fluid at the predetermined line pressure is conducted through means of conduit 88 and adjustable orifice 82 so as to fill reservoir 90 at a controlled rate and thus for a known time period. As reservoir 90 is filled, the fluid pressure within conduit 88 is communicated through means of conduit 92 to pressure-operable actuator 62 of pilot valve 60, which moves valve 60 at a predetermined pressure to the closed position and thereby prohibits fluid communication to motor 22. Adjustable orifice 82 of valve 80 may be adjusted for varying the rate of fluid transfer therethrough so as to control the period of time for filling reservoir 90 and thus adjusts the time delay between the opening of valve 70 and the closing of valve 60. Check valve 84 is coupled, both upstream and downstream of adjustable orifice 82, so as to relieve the fluid pressure both within conduit 88 and reservoir 90 so as to more rapidly evacuate these components after deactivation of motor 22 and the resetting of handle 30. More particularly, the closing of valve 70 exhausts conduit 78, and check valve 84 opens so as to expedite evacuation of conduit 88 and reservoir 90. Filter 96 in disposed within conduit 72 between the source of fluid pressure 14 and normally-closed valve 70 filters the fluid transferred to the timing control circuit 10.

In FIG. 2, timing control arrangement 10 is provided in an exemplary structure, as shown in the cutaway and exploded view. In this view, pilot valve 60 is insertable within a cylindrical passage 100 formed within a stem 102 provided at the rear portion of motor housing 40, which passage 100 communicates with conduit 18 through means of a bore 104. Fluid is communicated through means of conduit 18 and bore 104 to pilot valve 60 and, through and around first groove 61, to second bore 106 and conduit 72 for communication to normally-closed valve 70. Subsequent actuation of eccentric handle 30 so as to actuate welding or securing means assembly 32 also actuates valve 70 to the open position for fluid communication through means of conduits 78 and 88, as well as valve 80, to reservoir 90. In the illustrated embodiment, reservoir 90 is provided by means of sinusoidal tubing of a fixed length and cross section so as to provide the necessary volume for fluid transfer and back-pressure communication to pilot valve 60 through means of conduit 92. In this illustrated embodiment, conduits 88 and 92 are not clearly distinguishable but have been integrated as extensions of tubing 78. However, it is understood that the schematic drawing and the physical embodiment of the illustrations are equivalents. Subsequent pressure transfer to cavity 98 at the base of passage 100 operates against land 110 of valve 60, which is operable as the manual actuator 62, to develop pressure within cavity 98 so as to move pilot valve 60 to the closed position. At the closed position, land 110 blocks bore 104 and disrupts fluid communication from conduit 18, which effectively terminates operation of motor 22 and tool 12 so as to indicate termination of a joining and welding cycle.

While only specific embodiments of the invention have been described and shown, it is apparent that various alterations and modifications can be made thereto. It is, therefore, the intention of the appended claims to cover all such modifications and alterations as may fall within the scope and spirit of the invention.

What is claimed is:

1. A timing control arrangement, for a fluid-actuable tool for tightening and securing a loop of strapping about a package, comprising:
   first normally-closed manually-operable means for controlling fluid flow between said tool and a source of fluid at a predetermined line pressure;
   second normally-open means, disposed within a first conduit fluidically connecting said first normally-closed fluid flow controlling means and said source of fluid, and interposed between said first normally-closed fluid flow controlling means and said source of fluid, for controlling fluid flow between said first normally-closed fluid flow controlling means and said source of fluid at said predetermined line pressure;

third normally-closed manually-operable means, for controlling fluid flow between said source of fluid and said second normally-open means, having an upstream end and a downstream end;

a second conduit fluidically connecting said source of fluid and said upstream end of said third normally-closed fluid flow controlling means;

a fluid reservoir having a predetermined volume;

a third conduit fluidically connecting said downstream end of said third normally-closed fluid flow controlling means and said reservoir; and variable means, disposed within said third conduit between said reservoir and said downstream end of said third normally-closed fluid flow controlling means for controlling the rate of fluid flow to said reservoir and the time for attainment of fluid at said predetermined line pressure within said reservoir and said third conduit after said third normally-closed manually-operable fluid flow controlling means has been manually moved from a closed position to an open position;

said second normally-open fluid flow controlling means being fluidically connected to said third conduit at a position disposed downstream of said variable controlling means such that said second normally-open fluid flow controlling means is responsive to said fluid at said predetermined line pressure within said third conduit whereby said second normally-open fluid flow controlling means is moved from an open position to a closed position so as to interrupt said fluid flow from said fluid source to said first normally-closed manually-operable fluid flow controlling means and said tool even when said first normally-closed manually-operable fluid flow controlling means has been manually moved to an open position so as to actuate said tool.

2. A timing control arrangement as claimed in claim 1 wherein said second fluid flow controlling means is a three-way normally-open valve.

3. A timing control arrangement as claimed in claim 1 wherein said third fluid flow controlling means is a three-way, normally-closed valve.

4. A timing control arrangement as claimed in claim 1 wherein said variable means for controlling fluid flow is an adjustable flow control valve having a downstream side and an upstream side, said valve further comprising a check valve coupled between said downstream and upstream sides of said flow control valve so as to more rapidly relieve fluid pressure in said reservoir upon deactivation of said fluid-actuable tool.

5. A timing control arrangement as claimed in claim 1 further comprising a filter mounted in said second conduit between said third fluid flow controlling and said source of fluid at said line pressure.

6. A timing control arrangement as claimed in claim 1 wherein a tool has a first housing for said driving means and a second housing for a securing means, said timing control arrangement mounted and operable in said first and second housings.

7. A timing control arrangement as claimed in claim 1 wherein said reservoir is a predetermined length of tubing of a known diameter coupled between said variable flow control means and said second fluid flow controlling means controlling flow.

8. A timing control arrangement as claimed in claim 1 wherein said strapping is plastic.

9. A timing control arrangement as claimed in claim 6 wherein said means for securing provides a fusion weldment between overlapped strapping portions.

10. A timing control arrangement as claimed in claim 9, wherein said first fluid flow controlling means is a normally-closed valve, said tool further comprising a first manual lever operable to open said first means so as to communicate fluid at a predetermined pressure so as to actuate said means for driving;

said third fluid flow controlling means is a three-way normally-closed valve;

a second lever operable to actuate said means for securing, which second lever simultaneously opens said third fluid flow controlling means flow and said timing control arrangement for actuation of said securing means for a predetermined length of time.

11. A timing control arrangement as claimed in claim 10 wherein said tool has a first housing and a cover cooperating with said first housing so as to define a cavity for said means for driving, said reservoir being mounted and operable in said cavity.

12. A timing control arrangement for a pneumatically operable tool for tightening and securing a loop of plastic strapping about a package, comprising:

a source of fluid at a predetermined line pressure;

a first manually-operable, normally-closed valve interposed between said tool and said source of fluid at said predetermined line pressure;

a first conduit fluidically connecting said first manually-operable, normally-closed valve and said source of fluid at said predetermined line pressure;

a second pressure-operable, normally-open three-way valve operably mounted within said first conduit between said first valve and said source of fluid at said predetermined line pressure, wherein said second valve has a pressure-actuator operable at a predetermined line pressure to close said second valve and interrupt said fluid flow from said fluid source to said first valve;

a third manually-operable, normally-closed three-way valve having an upstream end and a downstream end;

a reservoir having a predetermined volume;

an adjustable means for adjustably controlling the rate of fluid flow;

a second conduit fluidically connecting said source of fluid at said predetermined line pressure and said upstream end of said third valve;

a third conduit fluidically connecting said downstream end of said third valve and said adjustable fluid flow means;

a fourth conduit fluidically connecting said adjustable fluid flow means and said reservoir; and a fifth conduit fluidically connecting said fourth conduit and said second valve pressure actuator, said adjustable fluid flow controlling means being operable to control said rate of fluid flow to said reservoir and said fifth conduit so as to actuate said second valve pressure-actuator at said predetermined line pressure when said third manually-operable normally-closed valve is opened and thereby close said second normally-open valve so as to terminate fluid flow to said tool at a predetermined time even when said first manually-operable normally-closed valve is opened.

13. A timing control arrangement as claimed in claim 12, wherein said tool has a first lever operable to first valve for fluid communication to a means for driving a loop constringing means and a second lever operable to simultaneously open said third valve and actuate a means for securing overlapped strapping portions.

14. A timing control arrangement for providing an adjustable and predeterminable operating period of time within a pneumatically operable device in order to control an operative cycle of said device, comprising:

a first conduit fluidically connecting said device and a source of fluid at a predetermined line pressure;

a first manually-operable, normally-closed, three-way valve wherein said valve has an open position to which said valve is movable from a normally closed position;

a second conduit fluidically connecting said source of fluid at said predetermined line pressure and said first manually-operable, normally-closed valve;

an adjustable flow rate control valve for adjustably controlling the rate of fluid flow;

a third conduit fluidically connecting said first manually-operable, normally-closed, three-way valve and said adjustable flow rate control valve;

a fluid reservoir;

a fourth conduit fluidically connecting said adjustable flow-rate control valve and said fluid reservoir; and a second line-pressure actuable, normally-open, three-way valve mounted within said first conduit between said source of fluid and said pneumatically-operable device for normally providing fluid communication through said second valve when said second valve is normally disposed at a normally-open reference position, and wherein said second valve has a pressure-operable actuator fluidically coupled to said fourth conduit such that said second valve is operable by said predetermined line pressure within said fourth conduit so as to be movable from said normally-open reference position to a closed position so as to block fluid flow to said device at a predetermined time after manual actuation of said first normally-closed, three-way valve to an open position.

15. A timing control arrangement as set forth in claim 12, wherein:

said adjustable means comprises an adjustable orifice valve having an upstream side and a downstream side; and a check valve is operatively coupled between said upstream and downstream sides of said orifice valve so as to rapidly relieve fluid pressure within said reservoir when said third manually-operable normally-closed valve is returned to its closed position from its opened position.

16. A timing control arrangement as set forth in claim 14, wherein:

said adjustable flow rate control valve comprises an adjustable orifice valve having an upstream side and a downstream side; and a check valve is operatively connected to said upstream and downstream sides of said orifice valve so as to rapidly relieve fluid pressure within said reservoir when said first manually-operable, normally-closed, three-way valve is returned to said normally closed position from said open position.

* * * * *